United States Patent [19]

Rahnke

[11] 4,406,125
[45] Sep. 27, 1983

[54] VARIABLE FLOW RATE TURBOCHARGER

[75] Inventor: Christian J. Rahnke, Orchard Lake, Mich.

[73] Assignee: Ford Motor Company, Dearborn, Mich.

[21] Appl. No.: 291,712

[22] Filed: Aug. 10, 1981

[51] Int. Cl.³ .............................................. F02D 23/00
[52] U.S. Cl. ..................................... 60/602; 415/147; 415/185; 415/DIG. 1
[58] Field of Search ................. 60/600, 601, 602, 603; 415/147, 185, DIG. 1

[56] References Cited

U.S. PATENT DOCUMENTS

| | | | |
|---|---|---|---|
| 2,825,532 | 3/1958 | Kadosch | 415/147 |
| 2,957,306 | 10/1960 | Attinello | 415/DIG. 1 |
| 3,270,495 | 9/1966 | Connor | 60/602 |
| 3,557,549 | 1/1971 | Webster | 60/602 |
| 3,726,604 | 4/1973 | Helms | 415/DIG. 1 |

FOREIGN PATENT DOCUMENTS 799675  8/1958  United Kingdom ......... 415/DIG. 1

*Primary Examiner*—Douglas Hart
*Attorney, Agent, or Firm*—D. J. Harrington; F. G. McKenzie

[57] ABSTRACT

A supercharger has a high pressure engine exhaust gas passage, a control gas duct communicating with the high pressure passage and a valve for opening and closing communication between the high pressure passage and the control gas duct. A turbine rotor is mounted at one end of driveshaft; a compressor rotor is mounted at the opposite axial end. Air at ambient conditions is admitted to the compressor rotor which is driven through the driveshaft from the turbine. The air is compressed and pumped into the intake manifold of a spark ignition engine. The valve operates to increase the flow rate of control gas at low engine speeds and to decrease the flow rate of control gas at high engine speeds. The control gas enters the mainstream of exhaust gas that flows in the turbine inlet duct thus restricting the area of the inlet duct when engine speed is low and increasing the exhaust gas flow rate when engine speed is high.

13 Claims, 3 Drawing Figures

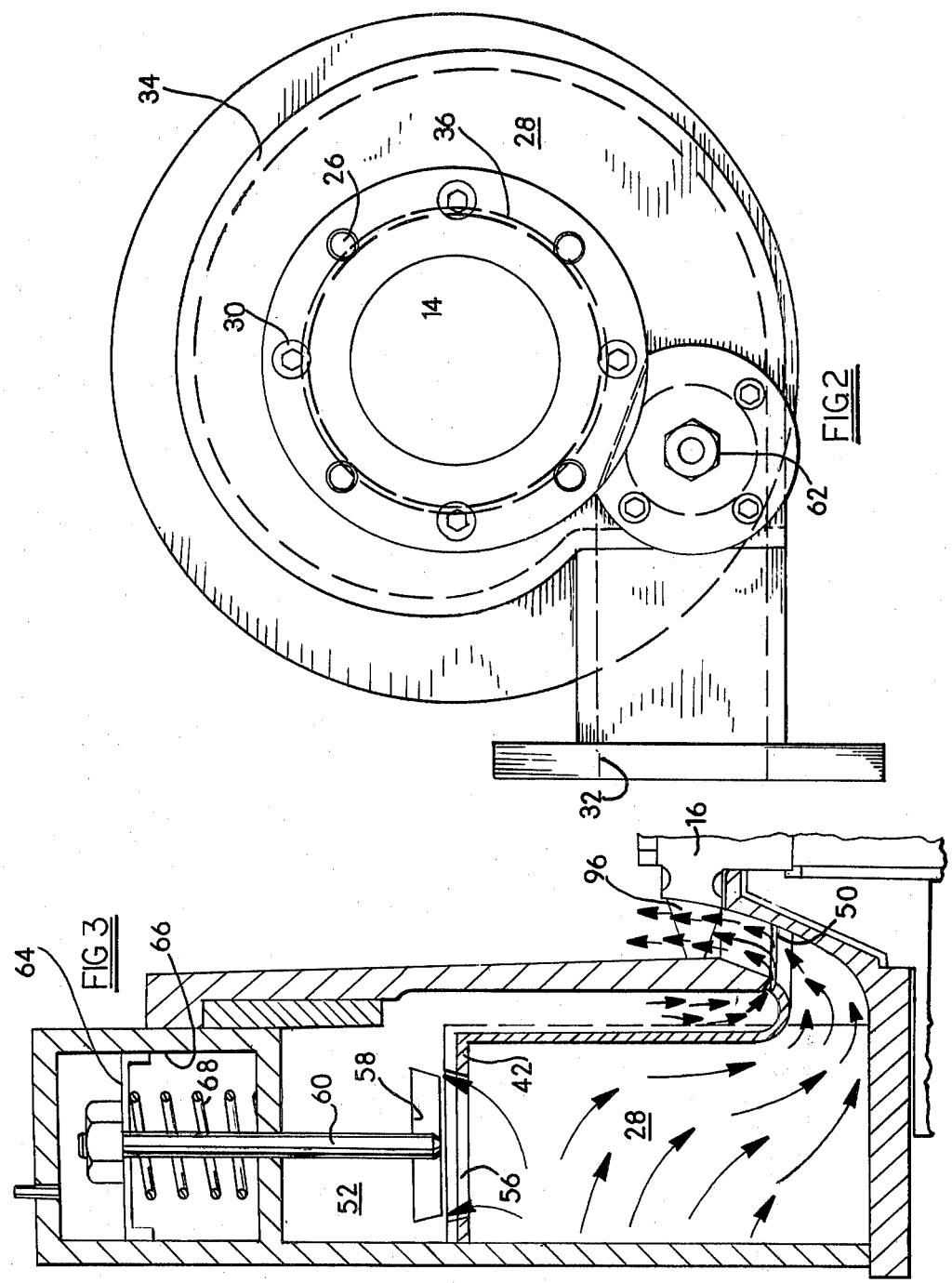

VARIABLE FLOW RATE TURBOCHARGER

BACKGROUND OF THE INVENTION

1. Field of the Invention

This invention relates to a supercharger for use with an internal combustion engine. More particularly, the invention pertains to a supercharger having a variable effective area through which engine exhaust gas can enter the turbine. More particularly still, the present invention concerns a means for control of the flow rate through the turbine and the exhaust system back pressure against which the engine must work.

2. Description of the Prior Art

A supercharger is a device used with an internal combustion engine for increasing the output power of the engine by increasing the amount and pressure of the air inducted into the engine. The power of the engine is directly limited by the amount of air that can be inducted during the intake stroke. Therefore, by compressing the inlet air to a pressure higher than the ambient conditions a greater quantity of air is inducted and the output power of the engine increased. In spark ignition engines the maximum boost in pressure of the inlet air should be in the range between six and eight psi. because of the tendency of such engines to knock if higher pressure inlet air is admitted to the engine.

Increasing the pressure of the inlet air has conventionally been accomplished by a supercharger wherein hot engine exhaust gas is passed through a turbine that is fixed to one end of a driveshaft. A centrifugal compressor mounted at the opposite end of the shaft compresses ambient air to the preferred range of pressure boost. Rotation of the compressor pumps the air radially outward into a volute that carries the compressed air to the inlet manifold of the engine.

It is important that a supercharger produces the necessary range of air pressure boost over the full operating range of the engine. If the supercharger were designed to produce full boost at the lower range of engine operating speed, for example, near 1500 rpm. and the full volume of exhaust gas were used to drive the turbine, the inlet air would be increased to approximately 20 psi at the high speed range of operation, for example, near 6,000 rpm. A boost of inlet air pressure to this level may be harmful to the engine structurally and detrimental to its function. An excessive back pressure in the engine exhaust gas system develops as speed increases because the cross-sectional area of the turbine is too small to accommodate the higher flow rates of engine exhaust gas although the area may be sufficient for the engine exhaust gas flow rate corresponding to the 1,500 rpm. range. Whereas the inlet air may receive a boost of approximately 12 inches of Hg at 6,000 rpm; back pressure is approximately 26 inches of Hg. It has been estimated that 1 inch of Hg back pressure reduces the output horsepower by approximately one percent.

Rather than sizing the supercharger at the low range of engine speed, the supercharger may be sized to accommodate the flow rate of engine exhaust gas corresponding to the intermediate range of engine speed. If, for example, the supercharger is designed to produce full boost at 3,000 rpm., an excessive boost would still result at 6,000 rpm. To avoid this difficulty, conventionally, a large portion of engine exhaust gas is allowed to bypass the turbine, the energy from the exhaust gas being thereby wasted. At 6,000 rpm., fully one-half of the available engine exhaust gas would be wasted to avoid excessive boost. Even with this technique, however, a pressure drop through the turbine of approximately six psi is imposed on the engine exhaust gas system against which the engine must work. The back pressure in the exhaust gas system is a power loss, yet half the energy of the exhaust gas that could be used to produce the requisite boost is not used for this purpose.

Another technique commonly used in superchargers to avoid overboost and excessive back pressure provides a low flow rate of exhaust gas to the turbine at the lower range of engine speed and increased flow rate at higher speeds. This is accomplished by turbine nozzles whose flow area is made smaller at low engine speed and made larger as engine speed increases. Such adjustable turbine nozzles require complex control and are inherently expensive.

SUMMARY OF THE INVENTION

Ideally, a supercharger would operate with reduced flow capacity through the turbine at the lower range of engine speed and greater flow capacity at higher engine speed. This would be done without producing excessive boost and while maintaining the pressure drop through the turbine at an acceptably low level.

The variable flow rate supercharger of this invention produces a reduced area for exhaust gas flow through the turbine at low engine speed by admitting, in a direction perpendicular to the mainstream of gas flow through the turbine inlet duct, a portion of the engine exhaust gas used as a control medium. The control gas flow rate varies with engine speed according to the setting of a valve that operates in response to the compressor discharge pressure to increase and decrease the valve opening. The valve is fully opened at low engine speed thus allowing the maximum flow rate of control gas to enter the mainstream at the turbine inlet duct and causing a maximum reduction in the effective cross-sectional area of the turbine inlet duct. The valve is progressively closed as compressor discharge pressure increases thereby increasing the effective cross-sectional area of the turbine inlet duct and allowing a greater flow rate through the turbine rotor. This has the effect of minimizing the pressure drop through the turbine when exhaust gas flow rates are high.

The supercharger according to this invention has a high pressure passage carrying exhaust gas from the engine to the turbine rotor and defining the turbine inlet duct. A control gas duct carries a portion of the exhaust gas from the high pressure passage to an annular slot through which control gas is admitted to the exhaust gas mainstream of flow in the turbine inlet duct. A valve that opens and closes the flow of exhaust gas from the high pressure passage to the control gas duct operates in response to the compressor discharge pressure.

BRIEF DESCRIPTION OF THE DRAWINGS

FIG. 2 is an end view of the supercharger of FIG. 1.

FIG. 3 is a view showing the control gas valve operated by a spring and compressor discharge pressure.

DESCRIPTION OF THE PREFERRED EMBODIMENT

Figure 1:
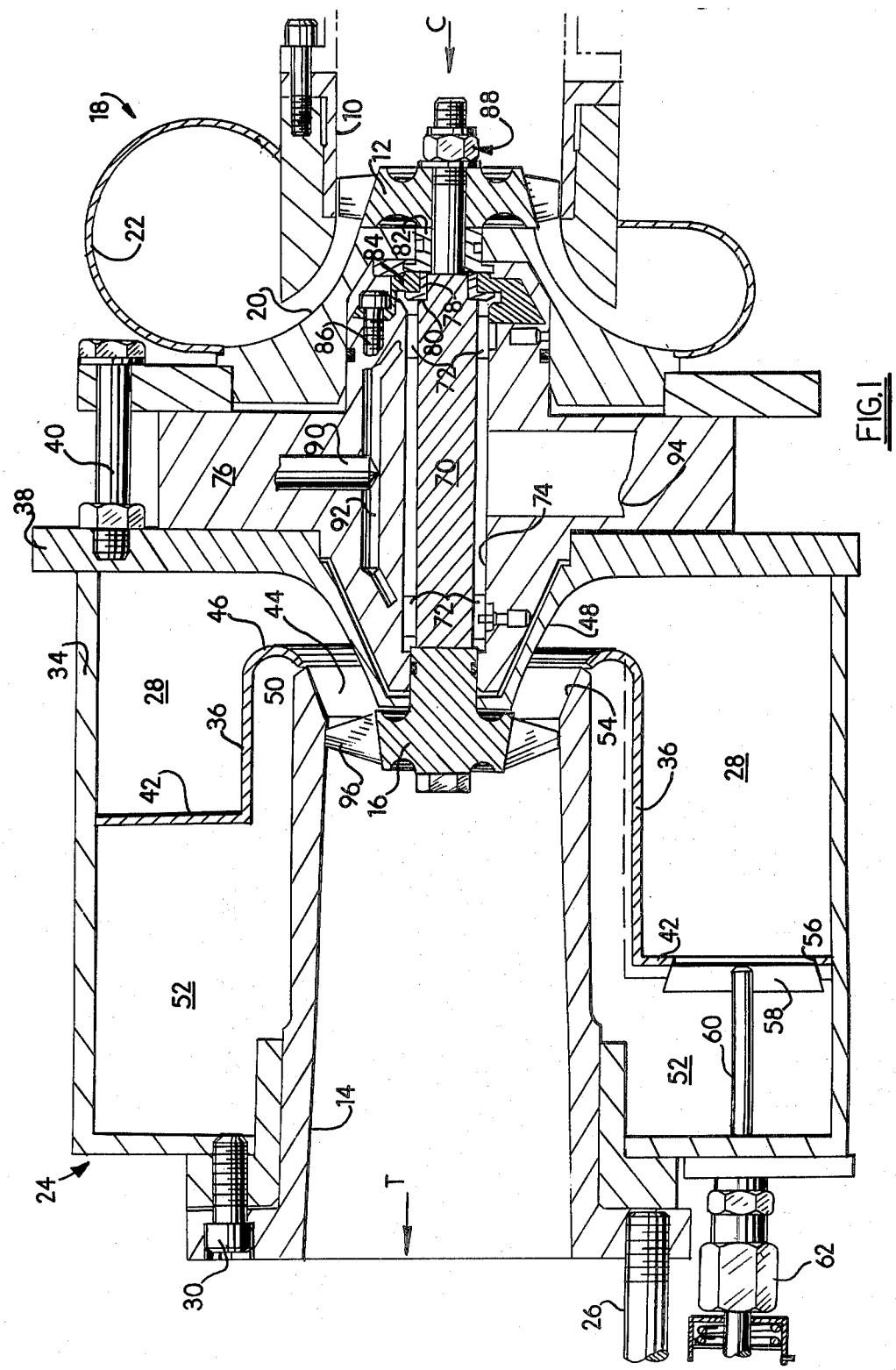
FIG. 1 is an elevation cross-section through the central axis of an axial flow supercharger made according to this invention.

A supercharger for compressing air supplied to an internal combustion engine is shown in FIG. 1. Fresh air is carried in an axially-directed duct 10 into the compressor rotor 12. At the opposite end, an axially-directed low pressure exhaust gas duct 14 carries engine exhaust gas from the supercharger after it has transferred a portion of its energy to the turbine rotor 16. The air casing 18 includes a compressor duct 20 through which compressed air flows to a volute 22 through which the compressed air travels a tangential path. The compressed air passes through the compressor rotor circumferentially around the volute casing and radially outward into the engine inlet manifold.

The exhaust gas casing 24 is mounted on the vehicle structure by mechanical attachments 26 that extend outward from a mounting flange formed integrally with the low pressure exhaust gas outlet duct 14. An exhaust gas volute 28 is mechanically joined by attachments 30 to the gas outlet duct 14. Exhaust gas enters the supercharger through a gas inlet duct 32 which directs the gas into volute 28. The volute has an outer wall 34 having a contour in the form of a circular spiral, which can be seen best in FIG. 2. The volute has an inner wall 36 that is cylindrical and symmetrical about the axis of the supercharger. The volute is bounded at the axially inner end by a mounting flange 38 that provides an attachment surface for joining the exhaust gas casing 24 to the air casing 18 by way of attachments 40. The axially outer end of the volute 28 is bounded by a radial wall 42.

From FIGS. 1 and 2 it can be seen that volute 28 has a continuously decreasing radial dimension as distance from the gas inlet duct 32 increases due to the spiral contour of outer wall 34. Similarly, with reference to FIG. 1, volute 28 can be seen to furnish a continuously decreasing axial dimension as distance from gas inlet duct 32 increases because the radial wall 42 is spiral-shaped.

The exhaust gas within volute 28 is led to a turbine inlet duct 44, which directs the exhaust gas radially and axially toward the turbine rotor. Inner wall 36 terminates at its radially inner end in a smoothly contoured lip 46 that directs the exhaust gas into the turbine inlet duct 44 and defines a portion of the outer radial surface of inlet duct 44. The inner radial surface of inlet duct 44 is defined by a generally conical surface 48 formed integrally with the mounted flange 38. The axially inner end of the exhaust gas outlet duct 44 provides a surface that defines the residual portion of the outer radial surface of turbine inlet duct 44.

An annular slot formed by the axial separation between the ends of the lip portion 46 of the volute and the end of the exhaust gas outlet duct 14 forms a passage through which a portion of the exhaust gas can be admitted into the turbine inlet duct from a control gas duct 52. Exhaust gas enters control gas duct 52 through an opening in wall 42 that furnishes a seat 56 on which a valve 58 can be fitted. The valve has a stem 60 that moves slidably within a bore formed in a fitting 62 secured to the exhaust gas casing 24. The valve stem can be fitted with a piston 64 that moves within a cylinder 66 as shown in FIG. 3. A coil spring 68 fitted between the piston and the wall of the cylinder applies a bias force to the valve tending to open communication between exhaust gas volute 28 and control gas duct 52. On the opposite side of the piston, compressor discharge pressure is admitted to cylinder 66 so that the positive pressure of the compressed air applies a force to the piston in the opposite direction from that of the spring force. Accordingly, when the speed of the rotor shaft 70 is low and compressor discharge pressure is low, the force of the spring exceeds the pressure force, valve 58 becomes unseated from surface 56 and the control gas duct receives a portion of the exhaust gas that flows through exhaust gas volute 28. As compressor discharge pressure increases, as it does with increased speed of the rotor shaft, progressively greater pressure is applied to piston 64 tending to overcome the force of the spring. In this way, valve 58 moves closer to valve seat 56 tending to close the valve and to reduce the quantity of exhaust gas admitted into the control gas duct 52. When compressor discharge pressure rises to a predetermined value, the pressure force on piston 64 is sufficient to close the valve 58 entirely.

The engine exhaust gas that enters control duct 52 from volute 28 looses its swirl or tangential velocity component because its flow in duct 52 becomes axially directed as it passes toward annular slot 50. The flow velocity within control duct 52 is substantially less than the velocity of the exhaust gas in volute 28, particularly as that flow enters turbine inlet duct 44. Consequently, the static pressure of the gas in duct 52 exceeds the static pressure of the gas in the inlet duct at the location of the annular slot. For this reason, the flow in the annular slot is in the direction from duct 52 and toward the turbine inlet duct 44.

It has been discovered that gas flowing through annular slot 50 in the direction indicated will operate to restrict the effective area of the turbine inlet duct through which exhaust gas from volute 28 can flow toward the turbine rotor. For example, if valve 58 is opened so that ten percent of the volume of exhaust gas entering volute 28 is allowed to pass through annular slot 50, the cross-sectional area of the turbine inlet area duct will be reduced by approximately forty percent of the total cross-sectional area of the turbine inlet duct. The control gas enters the mainstream flowing in duct 44 through slot 50 in a direction that is approximately perpendicular to the mainstream. This perpendicular flow operates to constrict the cross-sectional area of the inlet duct through which exhaust gas flowing in the direction of the inlet duct may pass. Downstream from the annular slot the control gas and exhaust gas mix, thereby effecting a momentum transfer therebetween before the combined flow reaches the turbine rotor. For best operating results the annular slot should be located between one and five turbine rotor blade lengths upstream from the transverse centerline of the turbine rotor.

Driveshaft 70 is joined by inertia or electron beam welding to the turbine rotor and is journalled by bearings 72 fixed to the bore 74 of the supercharger body 76. A thrust bearing 78 abuts the shoulder 80 formed on the driveshaft and contacts a second thrust bearing element 82 at its opposite axial end. A retainer ring 84 is located between the flanges of the thrust bearings and provides a recess into which is fitted the head of attachment bolt 86 that engages threads tapped in the central body portion of the supercharger.

An external screw thread formed on the end of driveshaft 70 is engaged by the nut 88, which upon being drawn up causes the compresser rotor 12, the thrust bearings 78, 82 and the driveshaft 70 to be held in a fixed axial relation. The compressor rotor 12 is secured to the outer surface of the driveshaft 70 by the preload developed when nut 88 is tightened thus preventing relative motion between the shaft and the rotor.

Ducts 90, 92 formed in the central body carry lubricant to the bearings 72 and the thrust bearings 78, 82. The lubricant is returned to a pressurized source of supply through duct 94.

The compressed air casing 18 can be an aluminum casting, but at the turbine end of the supercharger materials able to operate at high temperature are required. The exhaust gas casing 24 is preferably made of cast nodular iron. The turbine rotor 16, turbine blades 96 and driveshaft 70 are preferably made from stainless steel in order to have sufficient strength at the higher operating temperatures associated with the engine exhaust gas. These components can also be made from low density ceramic material such as silicon nitride or silicon carbide.

In operation, engine exhaust gas enters the supercharger through the exhaust gas inlet duct from the exhaust gas manifold of the engine and flows into the annular cavity of the gas volute 28 in which it attains a substantial swirl velocity component. Exhaust gas is then directed through the turbine inlet duct 44 and through the turbine rotor blades 96, which are driven by the energy of the exhaust gas thereby producing rotary motion of the turbine rotor and driveshaft. The driveshaft transmits power to the compressor rotor where the rotary energy is used to boost the pressure of the air inducted into the supercharger. At low engine speeds where the required boost of inlet air can be low, valve 58 is opened by spring 68 an amount that varies with the pressure of the compressed air. The control gas flows through annular slot 50 and restricts the effective cross-sectional area through the exhaust gas volute 28. This reduced flow rate reduces the amount of energy that is converted to rotary energy of the turbine and driveshaft. Consequently, less power is available at the compressor and its discharge pressure is kept low. When engine speed increases, the flow rate of exhaust gas through the turbine increases and the compressor discharge pressure increases. However, the increased discharge pressure operates to close valve 58 thereby restricting the flow of the control gas through annular slot 50. In this way the effective cross-sectional area of the turbine inlet duct progressively increases as discharge pressure increases. Therefore, the back pressure against which the engine must work is less at higher engine speeds than it would have been if the effective cross-sectional area of the turbine inlet duct 44 had remained restricted by control gas flow through annular slot 50.

Having described the preferred embodiment of my invention, what I claim and desire to secure by U.S. Letters Patent is:

1. An axial flow supercharger for compressing air inducted by an engine comprising:
   a rotor shaft;
   a turbine rotor secured to the shaft having blades extending radially therefrom, through which the engine exhaust gas flows and drives the turbine;
   a compressor rotor secured to the shaft having compressor blades extending radially therefrom through which air flows and is compressed;
   a compressor casing for carrying air through the compressor rotor to the engine;
   an exhaust gas casing surrounding the turbine rotor forming a high pressure gas volute having a first passage directed tangentially with respect to the axis of the turbine rotor, a second passage directed circumferentially about the turbine rotor and a turbine inlet duct through which exhaust gas is carried from the second passage to the turbine rotor, whereby the exhaust gas entering the turbine rotor has velocity in the tangential and axial directions;
   a control duct directed parallel to the axis of the turbine rotor for carrying a portion of the exhaust gas flow from the high pressure gas volute to the turbine duct, having an orifice for directing exhaust gas from the control duct into the exhaust gas stream that passes through the turbine rotor; and
   valve means for opening the flow of exhaust gas from the high pressure gas volute to the control duct when the pressure at the compressor outlet decreases and for closing said flow when the pressure at the compressor outlet increases.

2. The device of claim 1 wherein the valve means includes:
   a valve seat formed in a partition between the high pressure gas volute and the control duct;
   a valve having a stem moving within a cylinder, the stem having a piston attached thereto, the valve being biased by a spring away from the valve seat; and
   means communicating the discharge air pressure of the supercharger with the cylinder whereby positive discharge pressure is applied to the piston tending to close the valve on the valve seat.

3. The supercharger of claim 1 wherein the turbine includes one row of turbine blades and has no inlet guide vanes.

4. The supercharger of claim 1 wherein the flow area of the second passage of the high pressure exhaust gas volute decreases as the distance along the second passage from the first passage increases.

5. The supercharger of claim 1 wherein the turbine includes one row of turbine blades and has no inlet guide vanes and wherein the flow area of the second passage of the high pressure exhaust gas volute decreases as the distance along the second passage from the first passage increases.

6. The supercharger of claim 1 wherein the valve means opens the flow of exhaust gas from the high pressure gas volute to the control duct when the engine speed decreases and closes said flow when the engine speed increases.

7. The supercharger of claim 1 wherein the valve means operates in response to compressor outlet pressure to open the flow of exhaust gas from the high pressure gas volute to the control duct when the pressure at the compressor outlet decreases and to close said flow when the compressor outlet pressure increases.

8. The supercharger of claim 1 wherein the velocity of exhaust gas flowing within the control duct is substantially less than the velocity of exhaust gas flowing within the high pressure gas volute turbine inlet duct.

9. The supercharger of claim 1 wherein the orifice of the control duct is directed substantially perpendicular to the exhaust gas stream within the high pressure gas volute inlet duct.

10. The supercharger of claim 1 wherein the orifice directs exhaust gas into the exhaust gas stream within the high pressure gas volute inlet duct.

11. The supercharger of claim 1 wherein the orifice is formed in the wall of the control duct.

12. The supercharger of claim 1 wherein the tangential velocity component of the exhaust gas within the control duct at the orifice is substantially less than the tangential velocity component of the exhaust gas within the high pressure gas volute turbune inlet duct.

13. The supercharger of claim 1 wherein the orifice of the control duct is directed substantially perpendicular to the exhaust gas stream within the high pressure gas volute inlet duct and the orifice is formed in the wall of the control duct.

* * * * *